US012020700B2

(12) United States Patent
Chatar

(10) Patent No.: US 12,020,700 B2
(45) Date of Patent: Jun. 25, 2024

(54) VOICE AWARE DRILLING CONTROL AND REPORTING SYSTEM

(71) Applicant: Schlumberger Technology Corporation, Sugar Land, TX (US)

(72) Inventor: Crispin Chatar, Menlo Park, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 349 days.

(21) Appl. No.: 17/310,943

(22) PCT Filed: Mar. 2, 2020

(86) PCT No.: PCT/US2020/020626
§ 371 (c)(1),
(2) Date: Sep. 1, 2021

(87) PCT Pub. No.: WO2020/180773
PCT Pub. Date: Sep. 10, 2020

(65) Prior Publication Data
US 2022/0084515 A1 Mar. 17, 2022

Related U.S. Application Data

(60) Provisional application No. 62/812,257, filed on Mar. 1, 2019.

(51) Int. Cl.
*G10L 15/22* (2006.01)
*E21B 41/00* (2006.01)
(Continued)

(52) U.S. Cl.
CPC .............. *G10L 15/22* (2013.01); *E21B 41/00* (2013.01); *G10L 15/063* (2013.01);
(Continued)

(58) Field of Classification Search
CPC ... G10L 15/22; G10L 15/063; G10L 15/1815; G10L 2015/223; G10L 2015/228; E21B 41/00
See application file for complete search history.

(56) References Cited

U.S. PATENT DOCUMENTS 7,627,466 B2 * 12/2009 Ramsey ................. G06F 40/35
704/7
2009/0119587 A1 5/2009 Allen et al.
(Continued)

FOREIGN PATENT DOCUMENTS

WO 2016188593 12/2016

OTHER PUBLICATIONS

Kelly, R.E. "Speech And Hearing: Using Them To Assist Offshore Systems Operators." Paper presented at the Offshore Technology Conference, Houston, Texas, Apr. 1979. doi: https://doi.org/10.4043/3416-MS (Year: 1979).*
(Continued)

*Primary Examiner* — Brian L Albertalli
(74) *Attorney, Agent, or Firm* — Michael Guthrie

(57) ABSTRACT

A computer-implemented method for providing a voice interface system comprising: monitoring a first voice input during a training phase; monitoring manual inputs to a system during the monitoring the first voice input; storing training information associating the first voice input with the manual inputs; receiving a second voice input during an operational or runtime phase after the associating; identifying an instruction corresponding to the second voice input based on the training information; and executing the identified instruction.

20 Claims, 6 Drawing Sheets

(51) Int. Cl.
*G10L 15/06* (2013.01)
*G10L 15/18* (2013.01)

(52) U.S. Cl.
CPC .... *G10L 15/1815* (2013.01); *G10L 2015/223* (2013.01); *G10L 2015/228* (2013.01)

(56) References Cited

U.S. PATENT DOCUMENTS

| | | | |
|---|---|---|---|
| 2012/0290121 A1* | 11/2012 | Gronbach | G10L 15/22 700/180 |
| 2012/0323557 A1 | 12/2012 | Koll et al. | |
| 2017/0300845 A1 | 10/2017 | Mandava et al. | |
| 2018/0151177 A1* | 5/2018 | Gemmeke | G10L 15/06 |
| 2018/0173999 A1* | 6/2018 | Renard | G06F 40/30 |
| 2018/0356268 A1 | 12/2018 | Bryant | |
| 2019/0224849 A1* | 7/2019 | Tan | B25J 9/1669 |
| 2020/0026976 A1* | 1/2020 | Bagley, Jr. | G06N 3/004 |
| 2020/0257734 A1* | 8/2020 | Steinfort | G06F 8/34 |

OTHER PUBLICATIONS

International Search Report and Written Opinion of International Application No. PCT/US2020/020626 (12 pages).
International Preliminary Report on Patentability of International Patent Application No. PCT/US2020/020626 dated Sep. 16, 2021, 11 pages.

* cited by examiner

VOICE AWARE DRILLING CONTROL AND REPORTING SYSTEM

CROSS-REFERENCE TO RELATED APPLICATIONS

This application claims priority to U.S. Provisional Application 62/812,257, which was filed on Mar. 1, 2019, and is incorporated herein by reference in its entirety.

BACKGROUND

A drilling system at a wellsite may include a computer system with a user interface via which user commands may be received via the user interface (e.g., via keyboard/mouse inputs). The user interface may be used to control drilling functions and parameters, enter operation logs, access data from sensors implemented within the drilling system, etc.

SUMMARY

Embodiments of the disclosure may include a computer-implemented method for providing a voice interface system. The method may include monitoring a first voice input during a training phase; monitoring manual inputs to a system during the monitoring the first voice input; storing training information associating the first voice input with the manual inputs; receiving a second voice input during an operational or runtime phase after the associating; identifying an instruction corresponding to the second voice input based on the training information; and executing the identified instruction.

In another aspect, a computing system may include one or more processors; and a memory system comprising one or more non-transitory computer-readable media storing instructions that, when executed by at least one of the one or more processors, cause the computing system to perform operations. The operations may include monitoring a first voice input during a training phase; monitoring manual inputs to a second computing system during the monitoring the first voice input; storing training information associating the first voice input with the manual inputs; receiving a second voice input during an operational or runtime phase after the associating; identifying an instruction corresponding to the second voice input based on the training information; and executing the identified instruction.

In a further aspect, there is a non-transitory computer-readable medium storing instructions that, when executed by one or more processors of a computing system, cause the computing system to perform operations. The operations may include monitoring a first voice input during a training phase; monitoring manual inputs to a system during the monitoring the first voice input; storing training information associating the first voice input with the manual inputs; receiving a second voice input during an operational or runtime phase after the associating; identifying an instruction corresponding to the second voice input based on the training information; and executing the identified instruction.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
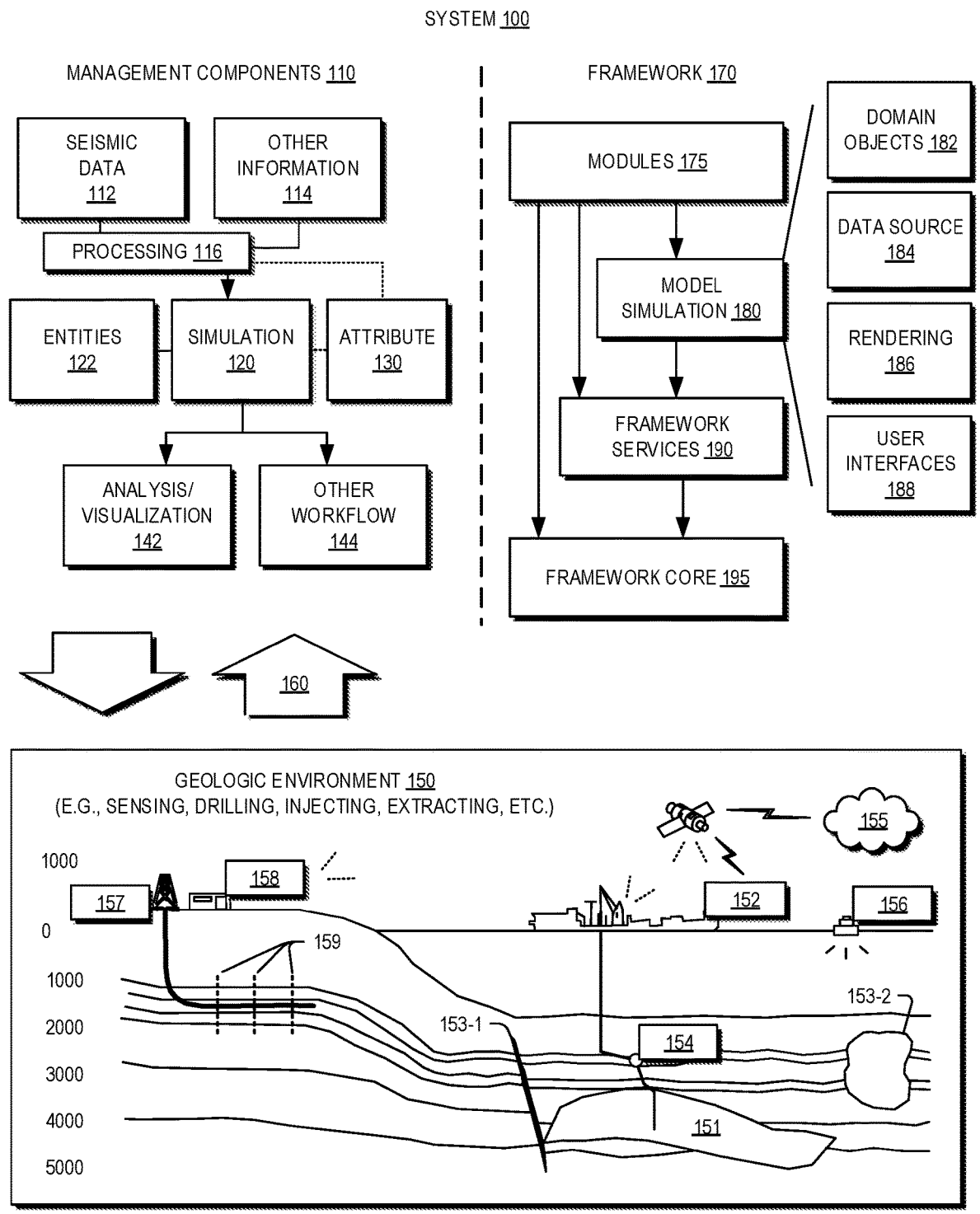
FIG. 1 illustrates an example of a system that includes various management components to manage various aspects of a geologic environment, according to an embodiment.

A user interface of a drilling system may be used to control drilling functions and parameters, enter operation logs, access data from sensors implemented within the drilling system, etc. (e.g., by providing user input via keyboard and mouse inputs). The drilling system's user interface may be rather complex and convoluted, as the volume of data available to the user and the number of commands that may be inputted are vast.

Accordingly, aspects of the present disclosure may incorporate a voice-based voice interface system, such as a natural language processing (NLP) input interface, into a drilling data collection and control system. In some implementations, the voice interface system may be used to enter drilling-related data via voice input, generate activity logs, control drilling operations via voice command (e.g., changing drilling parameters), provide audible responses to voice queries/commands, etc. Additionally, or alternatively, the voice interface system may be implemented at a drilling site control center or other similar type of location and may monitor spoken words, conversations, etc. at the drilling site control center. In some implementations, the voice interface system may passively monitor interactions, conversations, and/or spoken words by drilling workers/personnel, and extract relevant data from these conversations that relate to drilling operations. The extracted relevant data may be used to generate accurate and more rich activity logs with more information and data than activity logs that are generated based on keyboard input alone. In turn, these richer activity logs may be used to more accurately track drilling-based activities which improve decisions that are based on activity logs. Additionally, or alternatively, the voice interface system may passively monitor and extract relevant data from these conversations that relate to drilling operations in order to make inferences, provide suggestions for drilling control modifications, and/or provide any relevant updates.

In some implementations, the voice interface system may be used to audibly present data streamed from various sensors. Additionally, or alternatively, the voice interface system may be used to read data from sensors and deliver a concise report of relevant information. In some implementations, the voice interface system may determine relevancy over a period of time through machine learning of voice input in which the voice input indicates relevancy of different types of data.

In some implementations, aspects of the present disclosure may account for language and accent barriers when processing voice input, and may further eliminate outside noise and/or isolate a voice input for which to respond when multiple voices are "heard" (e.g., in a crowded room). Further, aspects of the present disclosure may incorporate language context from a particular field or industry to better interpret a voice instruction. In some implementations, the NLP input interface may connect with a database storing sensor data and/or other data associated with a drilling system/rig control system.

In some implementations, coding logic, machine learning/training, and/or other techniques may be used to build and/or implement one or more aspects of the present disclosure. For example, machine learning may be used to extract relevant data from conversations, determine the intent of a voice command/query, execute a drilling control instruction based on the intent, present suggestions for controlling drilling operations, and/or determine types of data to automatically report in different situations.

As described herein, a voice interface system, in accordance with aspects of the present disclosure may include a training phase and an execution or run-time phase. The training phase may be continuous. That is, the training of how the voice-based interface system responds to voice inputs may be continuously updated and improved to more accurately determine the context of a voice command, thereby more accurately executing a correct action in response to a voice command. As described herein, the training phase may include monitoring spoken words (e.g., e.g., in background or passive conversations), monitoring drilling activity/analytics data, monitoring manual inputs to a drilling control and reporting system, and linking the spoken words and drilling activities to the manual inputs. In this way, in the execution phase, the voice interface system may be trained to receive a voice command (e.g., an active or passive voice command), determine the context surrounding the voice command, and execute an appropriate action based on the voice command and the determined context.

Aspects of the present disclosure may include one or more algorithms to control rig operations, extract and audibly present data in real time from the rig. Aspects of the present disclosure may include logical components to use rig data in addition to voice commands to make decisions on possibly needed actions. In some implementations, systems and/or methods, described herein, may infer drilling context (e.g., jargon) to decipher the user's intent by interpreting the context of certain requests with consideration to the context. As an illustrative example, the user may ask the voice interface system, via voice input, "how fast we are drilling?" and the response provided by the voice interface system would be the value of a term called "ROP". Here, the voice interface system may identify that in the drilling context, speed is defined by the ROP parameter, and may audibly report the value of the ROP parameter.

Aspects of the present disclosure may improve the speed, accuracy, and usability of drilling system user interfaces. More specifically, aspects of the present disclosure may provide a drilling system that responds to voice input rather in addition to keyboard/mouse input, which improves the speed at which commands are received and executed. Further, aspects of the present disclosure may analyze surrounding contextual data when deciding how to handle voice inputs, thereby improving the accuracy of voice command interpretation in a drilling system. Additionally, or alternatively, aspects of the present disclosure may improve the speed, accuracy, and usability of a drilling system user interface by continuously learning and updating voice command interpretation based on a continuous monitoring of passive voice data (e.g., background voice conversations), user feedback of actions taken in response to voice commands, follow-up manual user instructions received after executing a voice command, etc. Further, aspects of the present disclosure may anticipate actions to take and/or reports to present (e.g., visually and/or audibly) based on active and/or passive voice input. In this way, users may receive relevant data reports from the user interface based on passive of background voice inputs, without the need to provide any keyboard/mouse inputs, and potentially without needing to provide an active voice command.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120. That is, the simulation component 120 is not limited to receiving seismic data.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
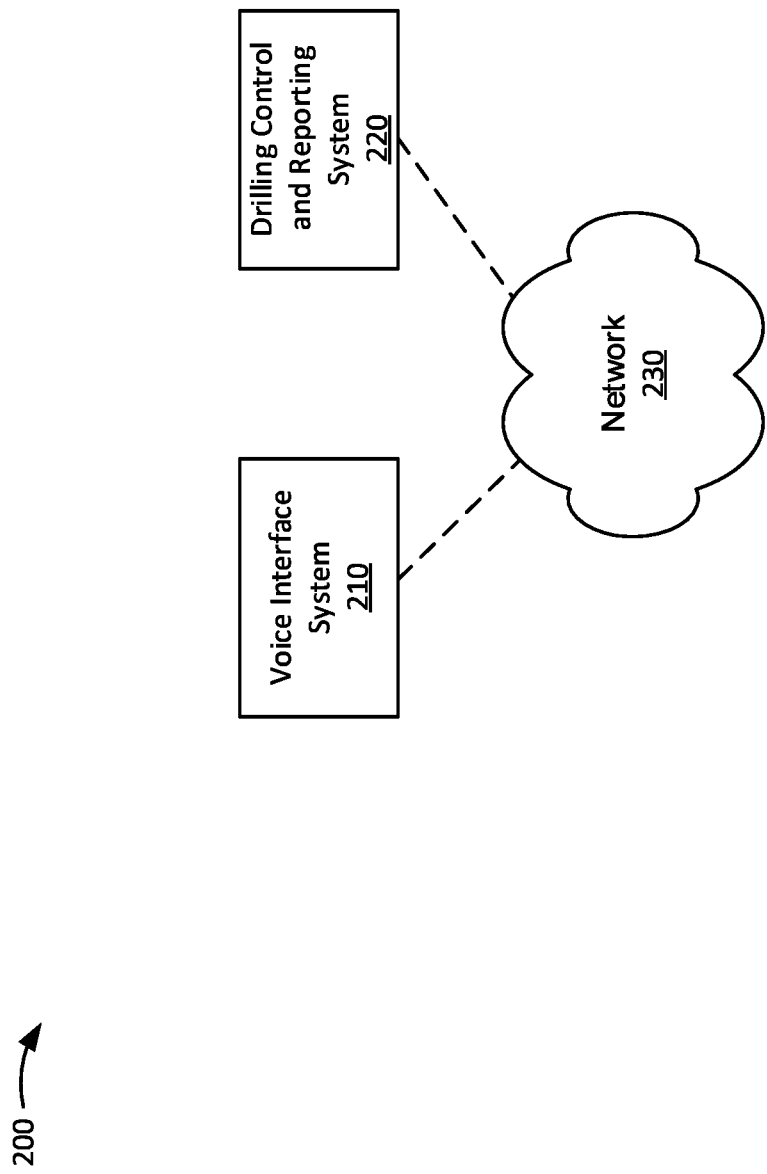
FIG. 2 illustrates an example environment in accordance with aspects of the present disclosure.

FIG. 2 illustrates an example environment in accordance with aspects of the present disclosure. As shown in FIG. 2, environment 200 includes a voice interface system 210, a drilling control and reporting system 220, and a network 230.

The voice interface system 210 may include one or more computing devices that host a voice command interface. In some embodiments, the voice interface system 210 may be implemented at a drilling site control center or other similar type of location and may be used to execute voice commands related to drilling operations based on voice input.

The voice interface system 210 may be trained, over a period of time, to respond to voice commands by monitoring drilling activity (e.g., as reported by the voice interface system 210), monitoring manual user inputs to the drilling control and reporting system 220, monitoring spoken words in connection with the manual user inputs, and linking the spoken words with the manual user inputs. Additionally, or alternatively, the voice interface system 210 may be trained in a more active manner in which a user provides a voice input and provides information linking the voice input to a corresponding command. Once trained, the voice interface system 210 may execute voice commands (e.g., related to drilling equipment control commands, storing or logging data, such as drilling related data, from voice input, etc.). For example, the voice interface system 210 may execute active voice commands (e.g., a voice command that a user deliberately or actively provides). Examples of active voice commands include executing a control instruction via the drilling control and reporting system 220, providing a set of data requested by a user via voice input, etc. Additionally, or alternatively, the voice interface system 210 may execute a "passive" task based on passive voice input (e.g., background conversations, etc.). One example passive task may include suggesting a control instruction to execute (e.g., an instruction that the voice interface system 210 anticipates users may wish to execute based on passive conversations). Another example passive task may include reporting a set of data (e.g., data that the voice interface system 210 anticipates users may wish to see based on passive conversations).

The drilling control and reporting system 220 may include one or more computing devices that monitors and/or controls operations of equipment (e.g., drilling equipment). In some embodiments, the drilling control and reporting system 220 may include one or more components of the geologic environment 150. For example, the drilling control and reporting system 220 may include sensors, detectors, data acquisition devices, or the like to obtain operational information (e.g., drilling activity) regarding equipment (e.g., downhole equipment, drilling equipment, etc.). In some embodiments, the operational information may be reported to the voice interface system 210. Further, the drilling control and reporting system 220 may execute one or more commands (e.g., drilling equipment control commands) received by the voice interface system 210.

The network 230 may include network nodes and one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
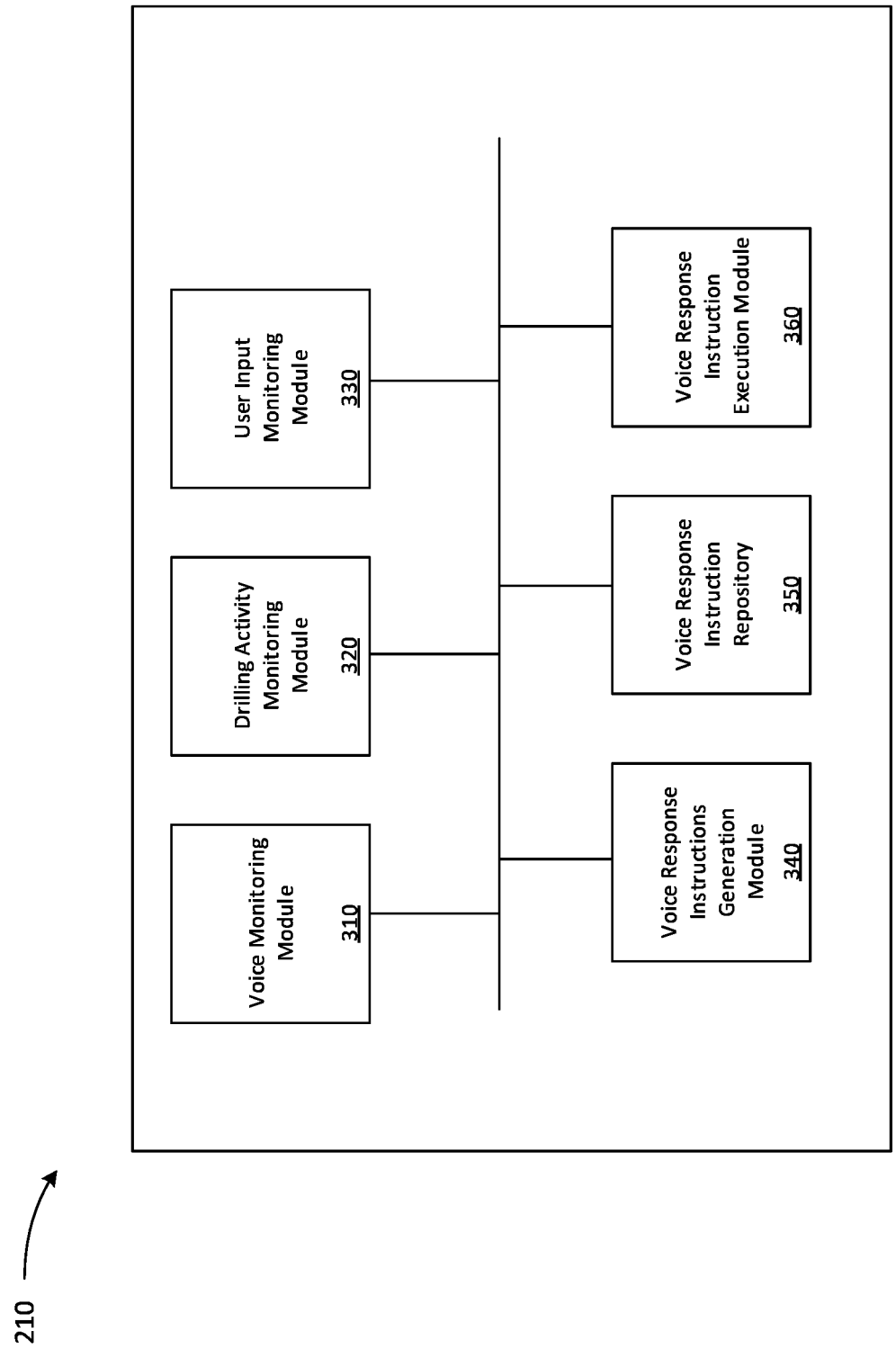
FIG. 3 illustrates a block diagram of example components of a voice interface system 210 in accordance with aspects of the present disclosure.

FIG. 3 illustrates a block diagram of example components of a voice interface system 210 in accordance with aspects of the present disclosure. As shown in FIG. 3, the voice interface system 210 includes a voice monitoring module 310, a drilling activity monitoring module 320, a user input monitoring module 330, a voice response instructions generation module 340, a voice response instruction repository 350, and a voice response instruction execution module 360. In embodiments, the s210 may include additional or fewer components than those shown in FIG. 3. In embodiments, separate components may be integrated into a single computing component or module. Additionally, or alternatively, a single component may be implemented as multiple computing components or modules.

The voice monitoring module 310 may include one or more program modules that monitors voice input. In some embodiments, the voice monitoring module 310 may monitor voice input as part of a training phase for training the voice interface system 210 to properly respond to voice inputs during an execution or runtime phase. As described herein, the voice monitoring module 310 may monitor passive voice inputs as part of a passive training phase. More specifically, the voice interface system 210 may monitor passive voice inputs, such as conversations conducted in a drilling equipment control setting. Additionally, or alternatively, the voice monitoring module 310 may receive active voice inputs as part of an active training phase (e.g., a training phase in which a user provides voice inputs and provides information linking the voice inputs to an appropriate command to be executed by the voice interface system 210).

The drilling activity monitoring module 320 may include one or more program modules that monitors drilling activity reported by the drilling control and reporting system 220. In some embodiments, the drilling activity monitoring module 320 may monitor any variety of drilling activity, including sensor data reported by the drilling control and reporting system 220, equipment health, operational information regarding equipment, etc.

The user input monitoring module 330 may include one or more program modules that monitors manual user inputs provided to the drilling control and reporting system 220 (e.g., inputs received via keyboard input, mouse input, or other type of input). Example user inputs may include entry of drilling-related data, equipment command/control instructions, modifying the presentation of information within a user interface, instructions to generate a report, etc.

The voice response instructions generation module 340 may include one or more program modules that generates instructions or actions to take based on voice inputs. More specifically, the voice response instructions generation module 340 may link or associate spoken words (e.g., as monitored by the voice monitoring module 310) to drilling activity (e.g., as monitored by the drilling activity monitoring module 320), and manual user inputs (e.g., as monitored by the user input monitoring module 330). In this way, the voice response instructions generation module 340 "learns" how to properly interpret and respond to voice inputs (e.g., either active or passive voice inputs). Example responses to voice inputs may include the entry of data into the drilling control and reporting system 220, execution of an equipment control command via the drilling control and reporting system 220, display of data within a user interface, providing a suggested command to execute via the drilling control and reporting system 220, providing an audible response to a voice input, etc. Further, the response to voice inputs may be based further on contextual information related to the drilling activity. As such, the voice interface system 210 may be trained to respond to voice inputs, which may include jargon terms associated with a particular field (e.g., the field of drilling operations) with further consideration to contextual or environmental data. Further, the voice response instructions generation module 340 may associate variations of spoken words using NLP techniques to drilling activity and monitored user inputs. The voice response instructions generation module 340 may provide the voice response instructions to the voice response instruction repository 350 for storage.

The voice response instruction repository 350 may include one or more storage repositories that stores the voice response instructions (e.g., generated by the voice response instructions generation module 340). As described herein, the voice response instruction repository 350 may store the voice response instructions in a data structure in which the data structure identifies data corresponding to a voice input, contextual data (e.g., drilling activity), and the appropriate response or action to take in response to the voice input and the contextual data. In other words, the voice response instruction repository 350 may store training information that links or associates voice input data with manual inputs and/or contextual information (e.g., drilling activity).

The voice response instruction execution module 360 may include one or more program modules that executes a voice instruction response based on a voice input received by the voice monitoring module 310 and/or based on contextual data received from the drilling activity monitoring module 320. In some embodiments, the voice response instruction execution module 360 may communicate with the voice response instruction repository 350 to access a data structure identifying the appropriate response or action to take in response to the voice input and the contextual data. As described herein, the voice response instruction execution module 360 may execute an instruction to enter data into the drilling control and reporting system 220, execute an equipment control command via the drilling control and reporting system 220, display a particular set of data within a user interface, modify the appearance of data presented within a user interface, provide a suggested command to execute via the drilling control and reporting system 220, provide an audible response to a voice input, etc.

Figure 4:
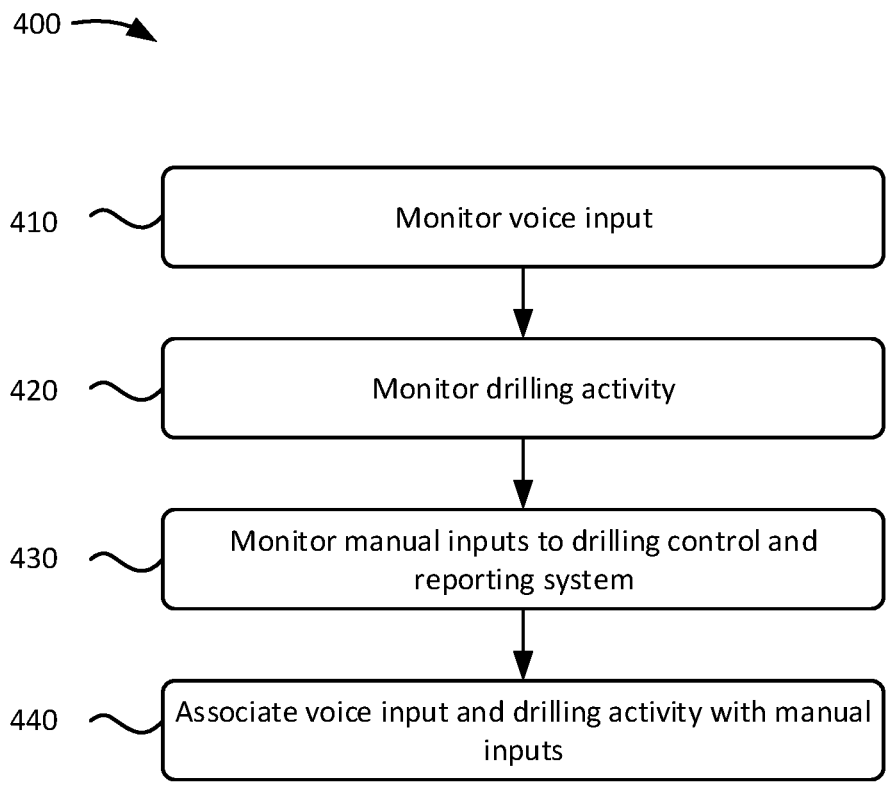
FIG. 4 illustrates an example process for training a voice interface system in accordance with aspects of the present disclosure.

FIG. 4 illustrates an example process 400 for training a voice interface system in accordance with aspects of the present disclosure. Process 400 may be performed by a computer system, such as a voice interface system 210. As described herein, process 400 may involve training the voice interface system 210 system to respond to voice input (e.g., either passive or active voice inputs).

As shown in FIG. 4, process 400 may include monitoring voice inputs (as at 410). For example, as described above with respect to the voice monitoring module 310, the voice interface system 210 may be monitor voice inputs (e.g., active or passive voice inputs relating to commands for a drilling system).

Process 400 may further include monitoring drilling activity (as at 420). For example, as described above with respect to the drilling activity monitoring module 320, the voice interface system 210 may monitor drilling activity reported by the drilling control and reporting system 220. In some embodiments, the voice interface system 210 may monitor any variety of drilling activity, including sensor data reported by the drilling control and reporting system 220, equipment health, operational information regarding equipment, etc.

Process 400 may also include monitoring manual inputs to the drilling control and reporting system (as at 430). For example, as described above with respect to the user input monitoring module 330, the voice interface system 210 may monitor manual inputs to the drilling control and reporting system 220 (e.g., inputs received via keyboard and/or mouse input). In some implementations, example user inputs may include entry of drilling-related data, equipment command/control instructions, modifying the presentation of information within a user interface, instructions to generate a report, etc.

Process 400 may further include associating the voice input with manual inputs and drilling activity (as at 440). For example, as described above with respect to the voice response instructions generation module 340, the voice interface system 210 may associate spoken words (e.g., passively monitored at block 410) with manual inputs (e.g., received at block 430) and/or with contextual information, such as drilling activity (received block 420). In some implementations, associating the spoken words may involve a machine learning process in which the voice interface system 210 may associate the spoken words when the spoken words have been "heard" by the voice interface system 210 within a threshold time from when the manual inputs were received. In this way, over a period of time, the voice interface system 210 may learn the spoken words that correspond to different inputs. Further, the voice interface system 210 may implement NLP techniques to associate various, synonyms, jargon terms, and/or alternate meanings of spoken words and sentences to associate such variations with the inputs. In this way, the voice interface system 210 may be able to interpret voice inputs having different variations, speech patterns/styles, etc. Further, by associating spoken words with the manual inputs, it is possible for the voice interface system 210 to identify the intent of a verbal input, extract pertinent portions of conversation that relate to drilling activity to be logged, and execute appropriate control instructions corresponding to a verbal input.

Figure 5:
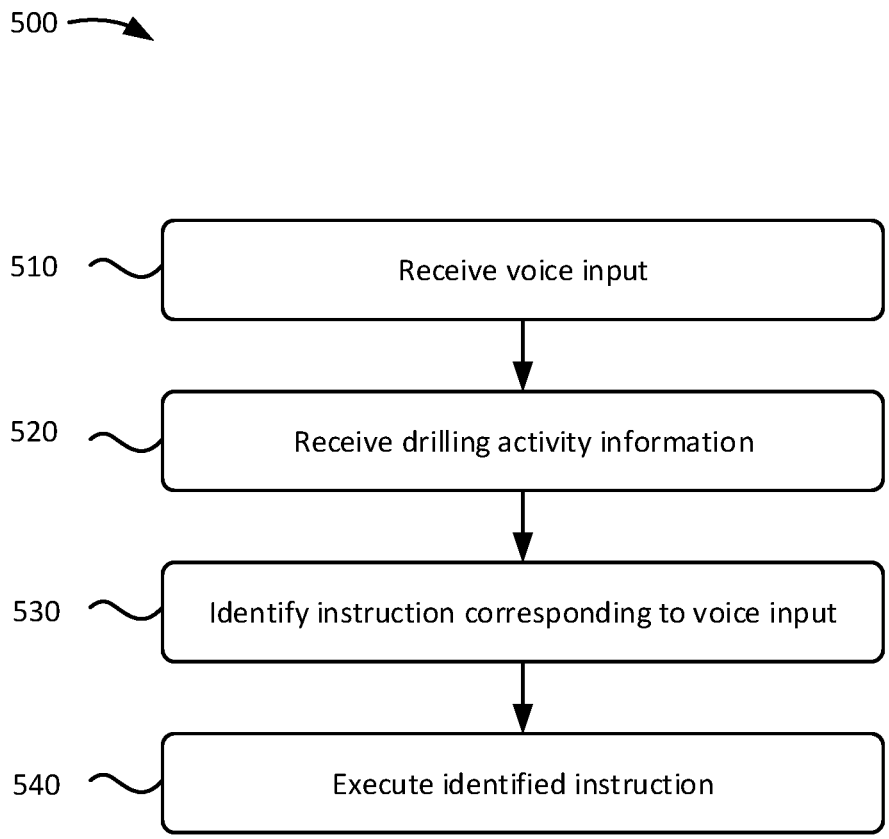
FIG. 5 illustrates an example process for using a trained voice interface system 210 for executing voice-based commands, entering data via voice input, and performing other tasks based on voice input.

FIG. 5 illustrates an example process 500 for using a trained voice interface system 210 for executing voice-based commands, entering data via voice input, and performing other tasks based on voice input. Process 500 may be performed by a computer system, such as a voice interface system 210.

Process 500 may include receiving voice input (as at 510). For example, as described above with respect to the voice response instruction execution module 360, the voice interface system 210 may receive a voice input (e.g., passive or active voice input). In some embodiments, the voice interface system 210 may monitor or "listen" for a passive voice input, without user instruction. Additionally, or alternatively, the voice interface system 210 may "listen" for an active voice input after receiving a user instruction from which the user may provide an active voice input. As described herein, a "passive voice input" may include spoken words, conversations, etc. that the voice interface system 210 "hears" passively (e.g., without the user actively instructing the NLP interface system to respond to a voice input). In some implementations, "active voice input" may include voice input provided as part of a specific instruction by a user for the NLP interface system to perform an action in response to the voice input.

Process 500 may also include receiving drilling activity information (as at 520). For example, the voice interface system 210 may receive current drilling activity information (e.g., contextual information) from the drilling control and reporting system 220.

Process 500 may further include identifying an instruction corresponding to the voice input (as at 530). For example, as described above with respect to the voice response instruction execution module 360, the voice interface system 210 may identify an instruction or an action to take based on the voice input received at block 510. In some implementations, the voice interface system 210 may identify the instruction based on a trained association between spoken words (from the received voice input) and manual inputs (e.g., as determined at block 430). More specifically, the voice interface system 210 may access the voice response instruction repository 350 (e.g., training information) to identify the appropriate response instruction to execute based on the voice input. For example, the voice interface system 210 may look up data representing the voice input in the voice response instruction repository 350, and identify the corresponding response instruction matching the voice input data. In this way, the voice interface system 210 may determine the intent of the voice input, how to process the voice input, and/or how to respond to the voice input. In some implementations, the voice interface system 210 may also filter background noise from the voice input, apply accent recognition techniques, etc. Further, the voice interface system 210

In some implementations, the voice interface system 210 may use the machine learning association and the training phase (described in FIG. 4) to determine the corresponding action to take for a voice input based on what actions have been previously taken for that same or similar voice input. As described herein, the identified instruction may include an instruction to log data, generate a report, modify drilling operations, etc.

Process 500 may also include executing the identified instruction (as at 540). For example, the voice interface system 210 may execute the identified instruction (from block 530). In this way, the voice interface system 210 may respond to a voice input in an accurate and constructive manner. Further, the voice interface system 210 may respond to passive voice inputs to anticipate user intents based on their passive conversations. As an example, the voice interface system 210 may automatically display a set of data based on passive voice inputs, and may also suggest equipment control instructions to take based on passive voice inputs and surrounding contextual information (e.g., drilling activity information). In this way, the voice interface system 210 may provide a more seamless and automated user experience in which the voice interface system 210 intelligently and proactively takes appropriate actions based on either passive or active voice inputs.

Figure 6:
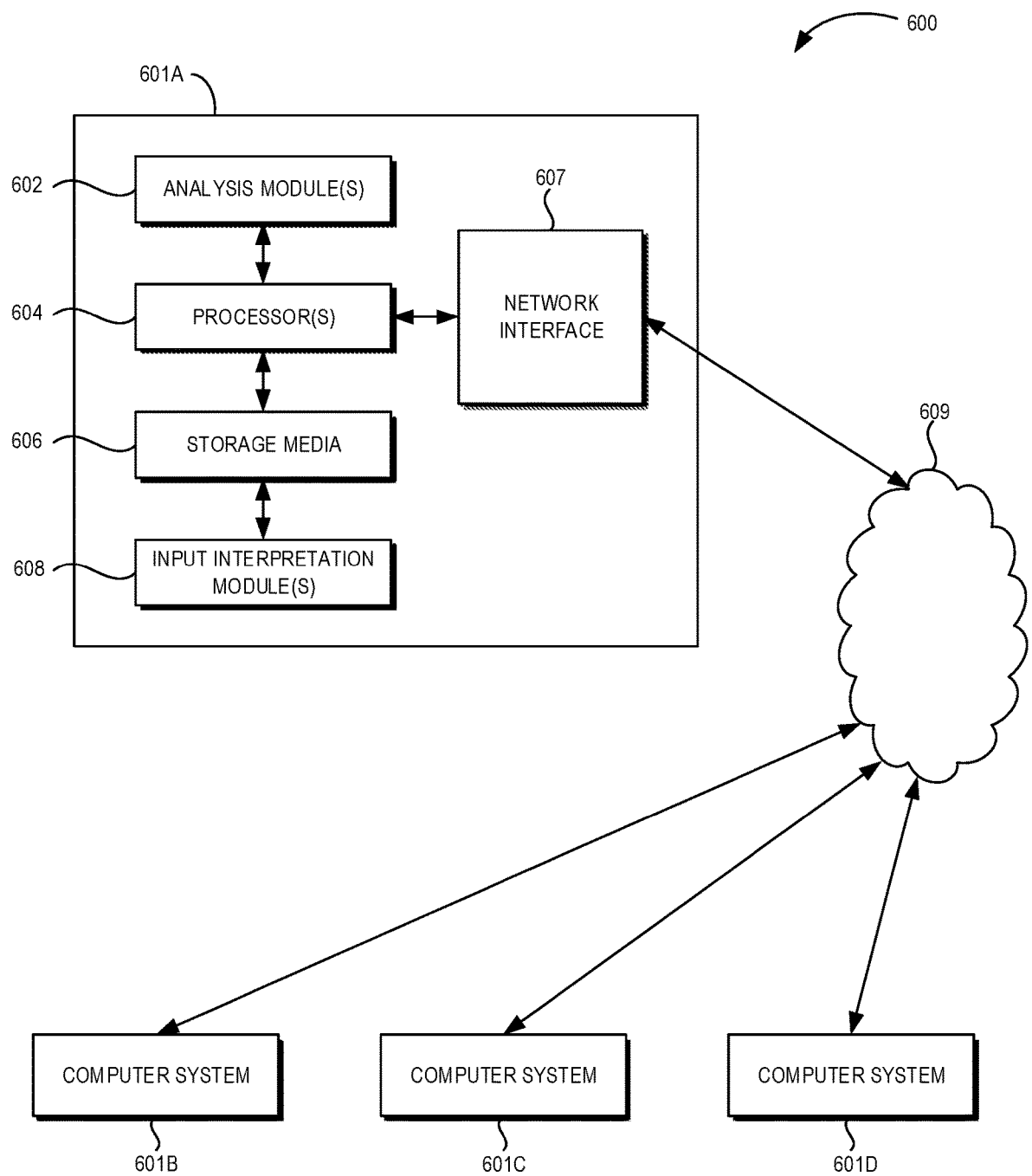
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more training, machine learning, and voice response modules 608. In the example of computing system 600, computer system 601A includes the training, machine learning, and voice response modules 608. In some embodiments, a single training, machine learning, and voice response modules 608 may be used to perform some aspects of one or more embodiments of the methods disclosed herein. In other embodiments, a plurality of training, machine learning, and voice response modules 608 may be used to perform some aspects of methods herein.

It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A computer-implemented method for providing a voice interface well drilling control and monitoring system comprising:
    monitoring a first voice input during a training phase;
    monitoring manual inputs to a system during the monitoring the first voice input;
    storing training information associating the first voice input with the manual inputs;

receiving a second voice input during an operational or runtime phase after the associating;
monitoring well drilling activity information;
associating the first voice input with the well drilling activity information;
identifying an instruction corresponding to the second voice input based on the training information and the first voice input associated with the well drilling activity information; and
executing the identified instruction.

2. The method of claim 1, wherein the first voice input or the second voice input comprise a passive voice input or an active voice input.

3. The method of claim 1, further comprising associating variations of the first voice input by applying natural language processing (NLP) techniques to spoken words of the first voice input.

4. The method of claim 1, wherein the instruction includes at least one selected from the group consisting of:
logging data;
generating a report;
controlling equipment operations;
modifying an appearance of a user interface;
presenting data; and
providing and audible response.

5. The method of claim 1, wherein the manual inputs include at least one selected from the group consisting of:
logging data;
generating a report;
controlling equipment operations;
modifying an appearance of a user interface; and
presenting data.

6. The method of claim 1, wherein the identifying the instruction comprises determining an intent of the second voice input.

7. The method of claim 1, further comprising:
sending the drilling activity information from a drilling activity monitoring module to the system.

8. The method of claim 7, wherein the drilling activity monitoring module monitors one or more of sensor data reported by the drilling control and reporting system, equipment health, and equipment operational information.

9. The method of claim 1, further comprising:
linking one or both of the first and second voice inputs to the drilling activity and the manual inputs.

10. A computing system for well drilling control and monitoring, comprising:
one or more processors; and
a memory system comprising one or more non-transitory computer-readable media storing instructions that, when executed by at least one of the one or more processors, cause the computing system to perform operations, the operations comprising:
monitoring a first voice input during a training phase;
monitoring manual inputs to a second computing system during the monitoring the first voice input;
storing training information associating the first voice input with the manual inputs;
receiving a second voice input during an operational or runtime phase after the associating;
monitoring well drilling activity information;
associating the first voice input with the well drilling activity information;
identifying an instruction corresponding to the second voice input based on the training information and the first voice input associated with the well drilling activity information; and
executing the identified instruction.

11. The computing system of claim 10, wherein the first voice input or the second voice input comprise a passive voice input or an active voice input.

12. The computing system of claim 10, wherein the operations further comprise associating variations of the first voice input by applying natural language processing (NLP) techniques to spoken words of the first voice input.

13. The computing system of claim 10, wherein the instruction includes at least one selected from the group consisting of:
logging data;
generating a report;
controlling equipment operations;
modifying an appearance of a user interface;
presenting data; and
providing and audible response.

14. The computing system of claim 10, wherein the manual inputs include at least one selected from the group consisting of:
logging data;
generating a report;
controlling equipment operations;
modifying an appearance of a user interface; and
presenting data.

15. The computing system of claim 10, wherein the identifying the instruction comprises determining an intent of the voice input.

16. The computing system of claim 10, wherein the operations further comprise:
sending the drilling activity information from a drilling activity monitoring module to the system.

17. The computing system of claim 16, wherein the drilling activity monitoring module monitors one or more of sensor data reported by the drilling control and reporting system, equipment health, and equipment operational information.

18. The computing system of claim 10, further comprising:
linking one or both of the first and second voice inputs to the drilling activity and the manual inputs.

19. A non-transitory computer-readable medium storing instructions that, when executed by one or more processors of a computing system, cause the computing system to perform well drilling control and monitoring operations, the operations comprising:
monitoring a first voice input during a training phase;
monitoring manual inputs to a system during the monitoring the first voice input;
storing training information associating the first voice input with the manual inputs;
receiving a second voice input during an operational or runtime phase after the associating;
monitoring well drilling activity information;
associating the first voice input with the well drilling activity information;
identifying an instruction corresponding to the second voice input based on the training information and the first voice input associated with the well drilling activity information; and
executing the identified instruction.

20. The computer-readable medium of claim 19, wherein the system comprises a drilling control and reporting system.

* * * * *